(12) United States Patent
Sato et al.

(10) Patent No.: US 7,167,623 B2
(45) Date of Patent: Jan. 23, 2007

(54) OPTICAL RECORDING DEVICE

(75) Inventors: Akinobu Sato, Soka (JP); Akiko Suzuki, Akishima (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 41 days.

(21) Appl. No.: 10/870,784

(22) Filed: Jun. 16, 2004

(65) Prior Publication Data

US 2004/0258383 A1    Dec. 23, 2004

(30) Foreign Application Priority Data

Jun. 18, 2003    (JP) .............................. 2003-173457

(51) Int. Cl.
*G02B 6/10*    (2006.01)

(52) U.S. Cl. .................. 385/129; 385/130; 369/13.56; 369/30.03; 720/718

(58) Field of Classification Search ........ 385/129–132; 720/718; 369/13.56, 30.03

See application file for complete search history.

(56) References Cited

U.S. PATENT DOCUMENTS 6,597,721 B1 *    7/2003    Hutchinson et al. .......... 372/98

| | | | |
|---|---|---|---|
| 2002/0048422 A1 * | 4/2002 | Cotteverte et al. | 385/4 |
| 2002/0150366 A1 * | 10/2002 | Loncar et al. | 385/125 |
| 2003/0185532 A1 * | 10/2003 | Hosomi et al. | 385/129 |
| 2003/0202764 A1 * | 10/2003 | Lee et al. | 385/129 |
| 2005/0152656 A1 * | 7/2005 | Talneau et al. | 385/129 |

FOREIGN PATENT DOCUMENTS

| | | |
|---|---|---|
| JP | 2001272555 | 10/2001 |
| JP | 2003036561 | 2/2003 |

* cited by examiner

*Primary Examiner*—Sung Pak
*Assistant Examiner*—Daniel Petkovsek
(74) *Attorney, Agent, or Firm*—David N. Lathrop, Esq.; Gallagher & Lathrop

(57) ABSTRACT

An optical recording device includes: a light source for emitting light of plural wavelengths; an optical waveguide formed by a crystal defect in a photonic crystal, into which light emitted from the light source is launched; an information recording/erasing unit for changing the shape of the photonic crystal near the optical waveguide; and a light detecting unit for detecting the light emitted from the optical waveguide. A contact probe of the information recording/erasing unit applies pressure to one of a plurality of periodically arranged columnar holes of the photonic crystal to widen its diameter, thereby capturing light of a wavelength $\lambda_k$ corresponding to the information to be recorded. Since the optical waveguide extends parallel to the crystal surface, the optical recording device can be integrated with an optical circuit.

3 Claims, 5 Drawing Sheets

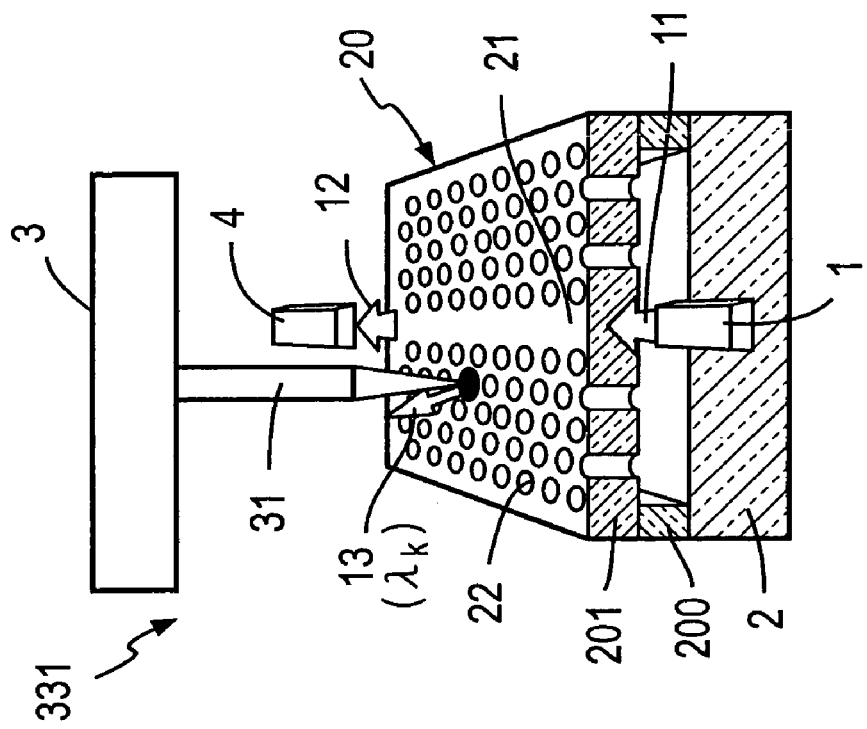
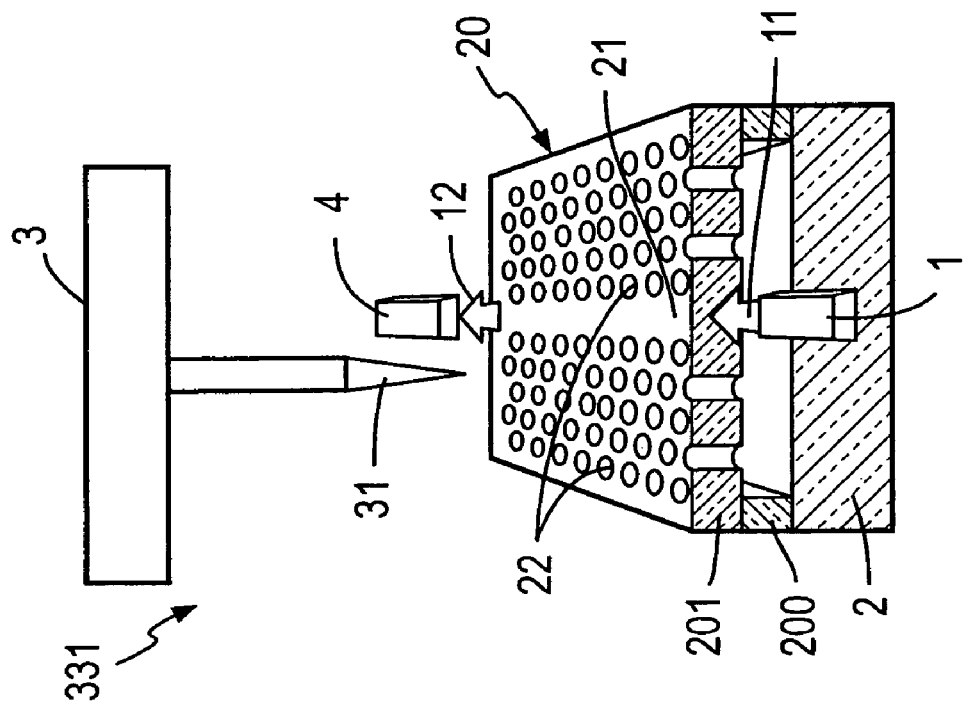

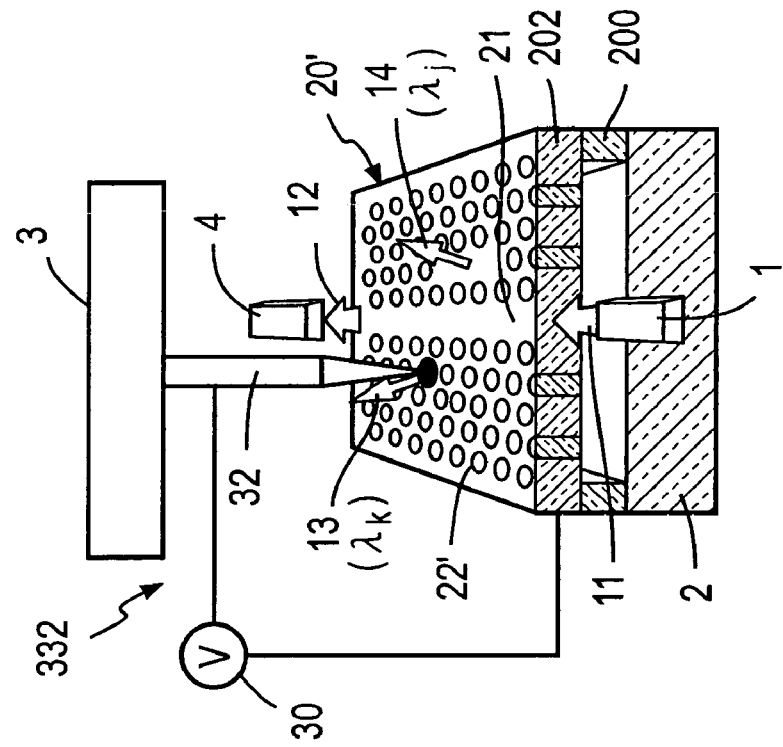
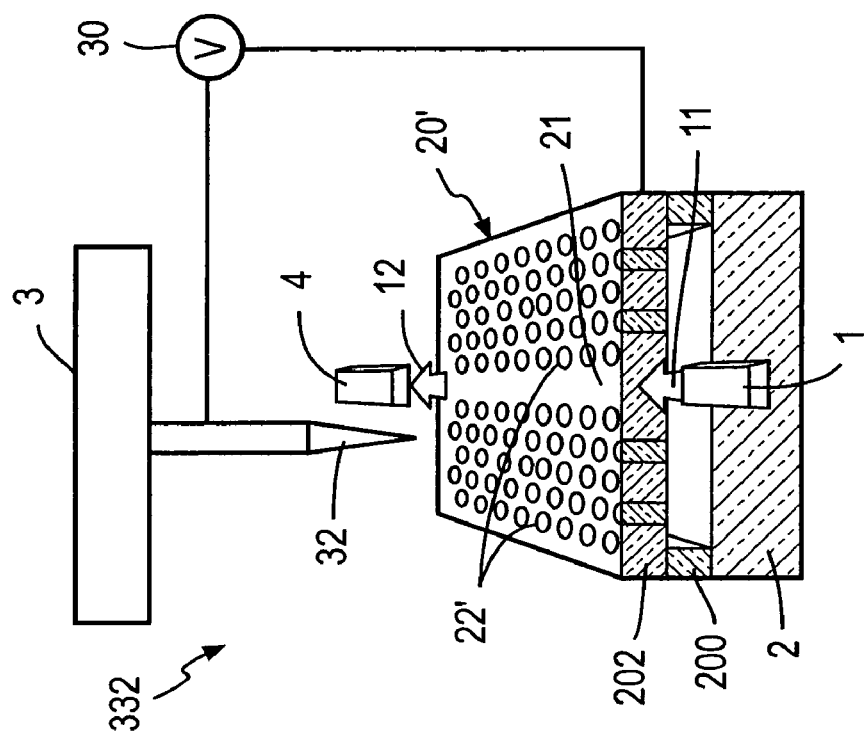
FIG. 4A
FIG. 4B

OPTICAL RECORDING DEVICE

BACKGROUND OF THE INVENTION

The present invention relates to an optical recording device and, more particularly, to an optical recording device that records and reproduces information by charging the periodic structure of a photonic crystal.

In recent years optical devices, called photonic crystals, have come to industry attention as devices that permit microminiature optical integrated circuits (ICs). The photonic crystals have a periodic structure with two kinds of media of different refractive indexes arranged in a repeating cyclic order. The photonic crystals fall roughly into one-dimensional (1-D), two dimensional (2-D) and three-dimensional (3-D) photonic crystals.

The 1-D photonic crystal has heretofore been known as a multi-layer film, and now it finds extensive applications such as a WDM (Wavelength Division Multiplexing) filter and various other devices. The 3-D photonic crystal has a structure formed by a three-dimensional periodic alternation of two kinds of media of different refractive indexes, and it is put to practical use, for example, as a polarization separating element.

The 2-D photonic crystal has a periodic structure in which columnar holes are formed in a high-refractive-index material in a square or triangular lattice pattern, or columnar pillars of a high-refractive-index material are formed in a low-refractive-index material in a square lattice pattern. Such a periodic structure provides a photonic bandgap, which controls in-plane (parallel to the crystal surface) propagation of light incident on the 2-D photonic crystal. By introducing a line crystal defect in the 2-D photonic crystal, an optical waveguide can be formed.

It is described in Japanese Patent Application Kokai Publication No. 2001-272555 (published Oct. 5, 2001, hereinafter referred to as Document 1) that wavelength filtering can be achieved by forming a defect in the photonic crystal near the optical waveguide.

In Japanese Patent Application Kokai Publication No. 2003-36561 (published Feb. 7, 2003, hereinafter referred to as Document 2) there is set forth an application of the photonic crystal to an optical recording device. This example uses the photonic crystal as a polarization separating layer interposed between first and second recording layers of a two-layer optical recording medium.

A typical example of an optical recording device is optical disks, and magneto-optical and phase change optical disks are put to practical use as writable disks. These optical disks are of the type that effects recording and reproduction of information by launching external light into the recording film on the substrate substantially perpendicularly thereto, and information is reproduced by reading reflected light from recorded pits.

Accordingly, in such optical disks there is no optical path in the in-plane direction of the recording film (parallel to the substrate surface), that is, these disks do not use light parallel to the substrate surface. Hence, the recording and reproducing system of such optical disks cannot be applied to an optical recording device integrated with an optical circuit having an optical waveguide in the substrate surface.

On the other hand, as described in Document 1, the 2-D photonic crystal allows the formation of an optical waveguide in the in-plane direction (parallel to the substrate surface), and hence it can be integrated into the optical circuit. In the prior art, however, nothing is disclosed about an optical recording device that uses the 2-D photonic crystal as a writable recording medium. The use of the photonic crystal in the optical recording device is limited only to, for example, separation of light as set forth in Document 2.

SUMMARY OF THE INVENTION

An object of the present invention is to provide an optical recording device that permits recording and erasure of information at any time, integration with the optical circuit, and fast readout.

According to an aspect of the present invention, there is provided an optical recording device that comprises: a light source for emitting light of a plurality of wavelengths; an optical waveguide formed by a crystal defect in the photonic crystal, into which the light emitted from said light source is launched; an information recording/erasing unit for changing the shape of the photonic crystal near said optical waveguide; and a light detecting unit for detecting light which is emitted from said optical waveguide.

According to another aspect of the present invention, there is provided an optical recording device which comprises: a light source for emitting light of a plurality of wavelengths; an optical waveguide formed by a crystal defect in the photonic crystal, into which the light emitted from said light source is launched; an information recording/erasing unit for changing the refractive index of the photonic crystal near said optical waveguide; and a light detecting unit for detecting light which is emitted from said optical waveguide.

The optical recording device according to the present invention uses the photonic crystal as a recording medium capable of recording and erasing information at any time, and hence it can be integrated with the optical circuit, and allows very fast readout of recorded information since no mechanical operation is involved in the readout.

BRIEF DESCRIPTION OF THE DRAWINGS

FIG. 1A is a perspective view schematically showing the configuration of a first embodiment of the optical recording device according to the present invention;

FIG. 1B is a perspective view showing, by way of example, the state in which information is recorded in the optical recording device of FIG. 1A;

FIG. 4A is a perspective view schematically showing the configuration of a second embodiment of the optical recording device according to the present invention;

FIG. 4B is a perspective view showing, by way of example, the state in which information is recorded in the optical recording device of FIG. 4A;

DETAILED DESCRIPTION OF THE PREFERRED EMBODIMENTS

Figure 2A:
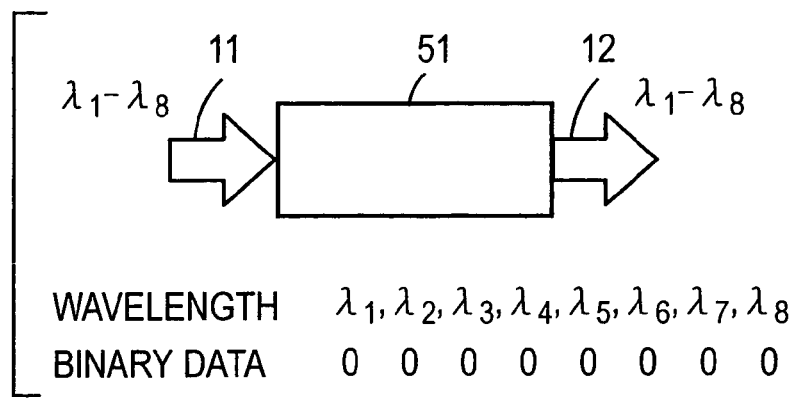
FIG. 2A is a diagram depicting the principle of operation of the optical recording device according to the present invention.

Embodiments of the present invention will hereinafter be described.

Embodiment 1

FIG. 1A is a schematic showing of the configuration of an optical recording device of this embodiment. The optical recording device has: a light source 1 for emitting wavelength-multiplexed light of plural wavelengths ($\lambda_1$–$\lambda_n$); an optical waveguide 21 formed by a crystal defect in a 2-D photonic crystal 20, into which input light 11 emitted from the light source 1 is launched; an information recording/ erasing unit 331 for changing the shape of those of columnar holes 22 forming the periodic structure of the 2-D photonic crystal 20 which are close to the optical waveguide 21; and a light detecting unit 4 for detecting output light 12 emitted from the optical waveguide 21.

The 2-D photonic crystal 20 with the columnar holes 22 arranged in a triangular lattice pattern is formed by an Si (silicon) layer 201. In this embodiment the 2-D photonic crystal 20 is formed using an SOI (Silicon on Insulator) substrate composed of an Si substrate 2, an $SiO_2$ layer 200 formed on the substrate 2, and the Si layer 201 overlying the $SiO_2$ layer 200.

The 2-D photonic crystal 20 with the optical waveguide 21 is fabricated, for example, by such a sequence of steps (1) to (5) as described below.

(1) Coat a electron beam resist all over the Si layer 201 of the SOI substrate.

(2) Perform patterning of the resist by electron beam lithography to leave a pattern of triangular lattice of circular areas arranged periodically as depicted in FIG. 1A. In this instance, a straight-line area of the resist, where to form the optical waveguide 21, is left unpatterned.

(3) Develop and remove the resist in the circular areas to form a resist pattern.

(4) Selectively remove the Si layer 201 by reactive ion beam etching using the resist pattern as a mask to form columnar holes 22 through the layer 201, thereby providing the 2-D photonic crystal 20.

(5) Finally, selectively remove the $SiO_2$ layer 200 underlying the 2-D photonic crystal 20 by wet etching to ultimately form the 2-D photonic crystal 20.

The wavelength-multiplexed light of wavelength ($\lambda_1$–$\lambda_n$) is launched as the input light 11 from the light source 1 into the optical waveguide 21 of the slab-structured 2-D photonic crystal 20 fabricated as described above, and the output light 12 emitted from the optical waveguide 21 on the side opposite to the light source 1 is detected by the light detecting unit 4. In this state (in the initial state) the incident light of all the wavelengths $\lambda_1$–$\lambda_n$ are allowed to propagate through the optical waveguide 21 and observed by the light detecting unit 4.

The information recording/erasing unit 331 is composed of a 3-D actuator 3, and a contact probe 31 fixedly connected to the 3-D actuator 3 for movement therewith. The information recording/erasing unit 331 is disposed above the 2-D photonic crystal 20. The 3-D actuator 3 is, for example, a piezoelectric actuator using a piezoelectric element. The contact probe 31 is diamond-tipped for grinding and pointed sharp.

The 3-D actuator 3 is driven to lower the contact probe 31 to insert its pointed end into the columnar hole 22 near the optical waveguide 21 as shown in FIG. 1B. Under pressure applied thereto through the contact probe 31 the Si layer 201 undergoes plastic deformation to widen the diameter of the columnar hole 22. The diameter of the columnar hole 22, which forms a point defect, is adjusted to a value at which to selectively capture such that light of the wavelength $\lambda_k$ corresponding to the information to be recorded, while monitoring the output light 12 by the light detecting unit 4.

After raising the contact probe 31 to pull its pointed end out of the columnar hole 22, wavelength-multiplexed light ($\lambda_1$–$\lambda_n$) is launched again into the optical waveguide 21 in the same manner as in the initial state. In this case, only the light of the wavelength $\lambda_k$ corresponding to the information to be recorded is selectively emitted from the columnar hole 22 of the widened diameter upwardly and downwardly of the 2-D photonic crystal 20 as indicated by the arrow 13, and the output light 12 to the light detecting unit 4 becomes light of wavelengths $\lambda_1$–$\lambda_{k-1}$ and $\lambda_{k+1}$–$\lambda_n$ except the light of the wavelength $\lambda_k$. By working the columnar hole 22 to change its diameter as described above, information can be recorded on the 2-D photonic crystal 20.

Figure 2B:
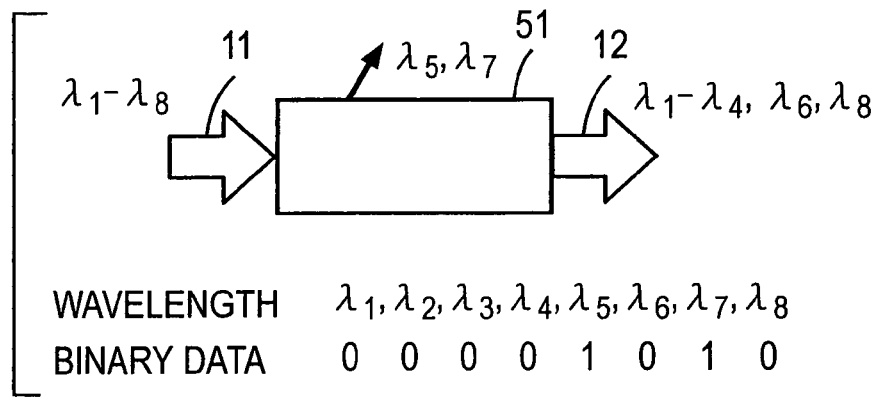
FIG. 2B is a diagram depicting the principle of operation of the optical recording device according to the present invention.

Referring to FIGS. 2A and 2B, the optical recording device of the present invention will be described below in more detail. Now, consider recording of 8-bit information. Light of eight wavelengths $\lambda_1$–$\lambda_8$ is sued as the wavelength-multiplexed light. Let it be assumed that when binary data is (00000000), the optical recording device using the above-described 2-D photonic crystal 20 does not capture and emits light of any wavelength. In the case of recording binary data (00001010), two columnar holes 22 are worked by the contact probe 31 so that they have diameters corresponding to the light of wavelengths $\lambda_5$ and $\lambda_7$, after which the binary data is recorded. As a result, the light of wavelengths $\lambda_5$ and $\lambda_7$ is emitted upwardly and downwardly of the 2-D photonic crystal 20, and light of the wavelengths corresponding to the above-mentioned binary data (00001010) is obtained as the output light 12, from which the 8-bit information can be read out.

Since the recorded information is thus read out, the optical recording device using the 2-D photonic crystal 20 is very high in information read rate. For example, assuming that the recorded information is in excess of 1 byte and that the distance from the light source 1 to the light detecting unit 4 is 1 mm, it takes about 3 ps for light to travel the distance; that is, the time for reading the 1-byte information is only 3 ps or so.

In the above the diameter of the columnar hole 22 is so adjusted as to capture light of the wavelength $\lambda_k$ corresponding to the information to be recorded while monitoring the output light 12, but if the relationships between the diameter of the columnar hole 22 and the wavelength to be captured are pre-accumulated as data, the columnar hole 22 needs only to be worked based on the data, in which case the output light 12 need not be monitored.

The recorded information can be erased, for example, by further widening the diameters of the columnar holes 22 corresponding to recorded bits so that light of any wavelengths launched into the optical waveguide 21 is not captured.

COMPARATIVE EXAMPLE

Figure 3:
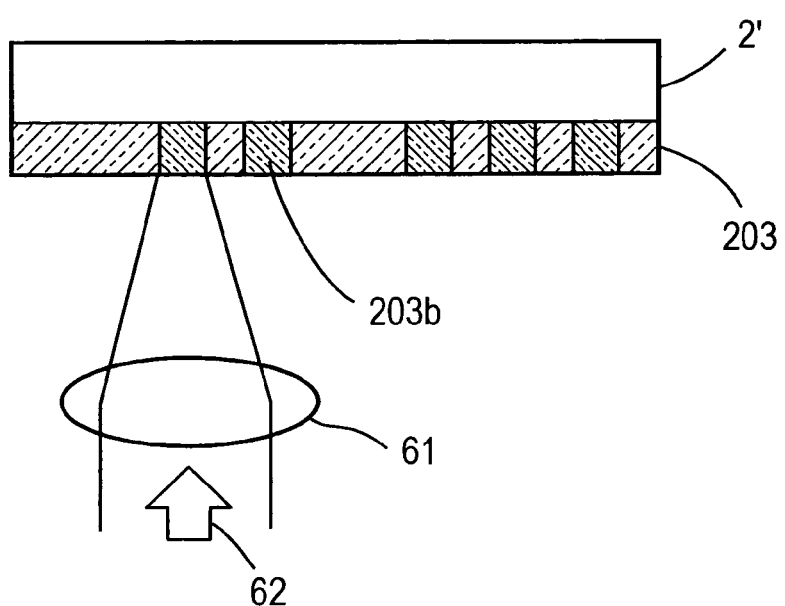
FIG. 3 is a diagram schematically showing a conventional optical recording device.

FIG. 3 is a schematic showing of the configuration of a phase change optical disk that is an example of a conventional optical recording device. In FIG. 3, reference numeral 2' denotes a substrate; 203 denotes a phase change recording medium; 203b denotes recorded pits; 61 denotes a condenser lens; and 62 denotes a laser beam.

The substrate 2' is formed by a polycarbonate resin board 120 mm in outer diameter, 15 mm in inner diameter and 0.6 mm in thickness. In the surface of the substrate 2' there is formed by injection molding a spiral groove 0.74 μm in track pitch, 55 nm in depth and 0.36 μm in width. The phase change recording medium 203 is composed of a ZnS—SiO$_2$ protective film (170 nm thick), a Ge—Sb—Te recording film (20 nm thick), a ZnS—SiO$_2$ protective film (30 nm thick), and an Si film (120 nm thick) formed by sputtering in this order.

In such a phase change optical disk, recorded pits are arranged at intervals of about 1 μm, for instance, and recording of 1-byte information requires a distance of 101 m or so. Assuming that the line rate is 10 m/s, it takes about 1 μs for light to travel a distance of 10 μm; therefore, the readout time of 1-byte information is approximately 1 μs. The read rate in this example is appreciably lower than in Embodiment 1.

Embodiment 2

FIG. 4A is a schematic showing of the configuration of an optical recording device according to this embodiment, in which a 2-D photonic crystal 20' is formed of an amorphous thin film 202 of the Ge—Sb—Te series that is a chalcogenide. The amorphous thin film 202 overlies the SiO$_2$ layer 200 formed on the Si substrate 2 as is the case with the Si layer 201 forming the 2-D photonic crystal 20 in Embodiment 1.

The 2-D photonic crystal 20' using the amorphous thin film 202 is formed by electron beam lithography. By heating circular areas in the surface of amorphous thin film 202 periodically arranged in a triangular lattice pattern by sequentially irradiating them with an electron beam, the regions of the amorphous thin film 202 defined by the circular areas are crystallized to form crystalline columns 22'. The heating temperature is set at a value between the crystallization temperature and melting point of the Ge—Sb—Te series amorphous material. In this case, a straight-line region where to form the optical waveguide 21 is left free from the crystalline columns 22'.

In the way described above, the 2-D photonic crystal 20' is fabricated which uses the difference in refractive index between the amorphous thin film 202 and the crystalline columns 22', and by selectively removing the SiO$_2$ layer 200 underlying the 2-D photonic crystal 20' by wet etching as in Embodiment 1, the slab-structured 2-D photonic crystal 20' is completed.

Disposed above the 2-D photonic crystal 20' is an information recording/erasing unit 332, which is comprised of a 3-D actuator 3, an electric field applying probe 32 that is driven by the actuator 3, and a power supply 30 connected between the probe 32 and the amorphous thin film 202. An electric field is formed between the electric field applying probe 32 and the amorphous thin film 202.

Wavelength-multiplexed light of wavelengths ($\lambda_1$–$\lambda_n$) is launched as the input light 11 from the light source 1 into the optical waveguide 21 of the 2-D photonic crystal 20', and the output light 12 from the optical waveguide 21 is detected by the light detecting unit 4. In this instance, the incident light of all the wavelengths $\lambda_1$–$\lambda_n$ propagates through the optical waveguide 21.

Then, the 3-D actuator 3 is driven to bring the electric field applying probe 32 to that one of the crystalline columns 22' which is located near the optical waveguide 21, and an electric field is applied to the crystalline column 22' to heat it up to a temperature between the crystallization temperature and melting point of the amorphous material forming the thin film 202. By this heating, the amorphous region surrounding the crystalline column 22' is crystallized to widen the diameter of the crystalline column 22'. In this case, the diameter of the crystalline column 22' is adjusted to a value at which the light of wavelength $\lambda_k$ corresponding to the recorded information is selectively captured; this adjustment is made while monitoring the output light 12 by the light detecting unit 4.

By increasing the electric field intensity to heat the crystalline column 22' up to a temperature above the melting point of the amorphous material, the crystalline column 22' can also be changed from crystalline to amorphous. In this instance, the number of crystalline columns 22' to be changed from crystalline to amorphous is to increase an amorphous area is determined such that the light of wavelength $\lambda_j$ corresponding to recorded information is selectively captured while monitoring the output light 12 by the light detecting unit 4. FIG. 4B shows an example in which three crystalline columns 22' became amorphous, that is, three crystalline columns 22' disappeared.

Launching wavelength-multiplexed light ($\lambda_1$–$\lambda_n$) into the optical waveguide 21 after bringing back the electric field applying probe 32 away from the 2-D photonic crystal 20', light of the wavelengths $\lambda_k$ and $\lambda_j$ corresponding to the information to be recorded is emitted from the diameter-widened crystalline column 22' and the increased amorphous area upwardly and downwardly of the 2-D photonic crystal 20' as indicated by the arrows 13 and 14. Accordingly, the output light 12 emitted to the light detecting unit 4 is light of the wavelengths $\lambda_1$–$\lambda_{j-1}$, $\lambda_{j+1}$–$\lambda_{k-1}$, $\lambda_{k+1}$–$\lambda_n$ except light of the wavelengths $\lambda_k$ and $\lambda_j$. In this way, information can be recorded on the 2-D photonic crystal 20'. The information read rate is very high as in Embodiment 1.

Embodiment 3

Figure 5A:
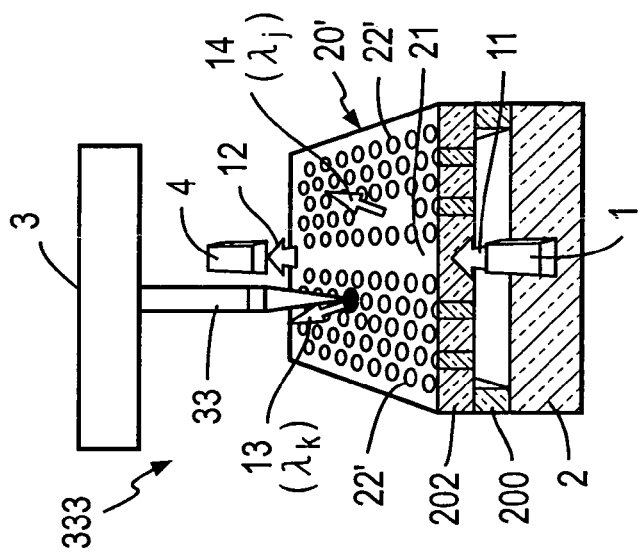
FIG. 5A is a perspective view schematically showing the configuration of a third embodiment of the optical recording device according to the present invention.

FIG. 5A is a schematic showing of the configuration of an optical recording device of Embodiment 3. The 2-D photonic crystal 20' is the same as that in Embodiment 2

This embodiment uses a heating probe 33 instead of using the electric field applying probe 32 in Embodiment 2. An information recording/erasing unit 333 is made up of the 3-D actuator 3 and the heating probe 33.

The heating probe 33 is to locally heat the 2-D photonic crystal 20'. By heating a selected one of the crystalline column 22' to crystallize the surrounding amorphous region to widen its diameter, and by heating the crystalline column 22' up to a temperature above the melting point of the amorphous material, the crystalline column 22' is changed from crystalline to amorphous. The heating probe 33 performs the same function as does the electric field applying probe 32 used in Embodiment 2.

Figure 5C:
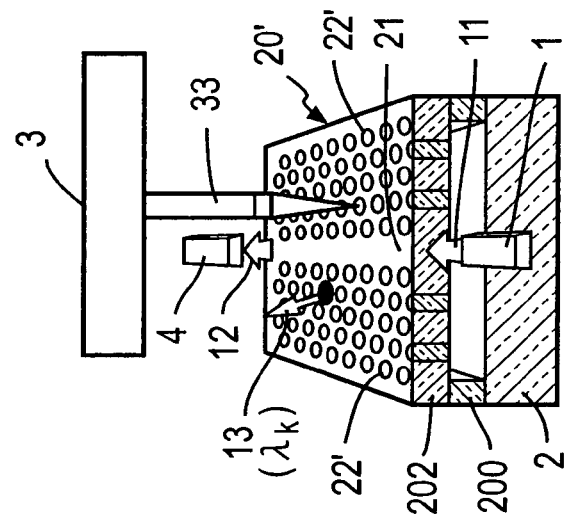
FIG. 5C is a perspective view showing the state in which recorded information is partly erased from the optical recording device of FIG. 5B.
Figure 5B:
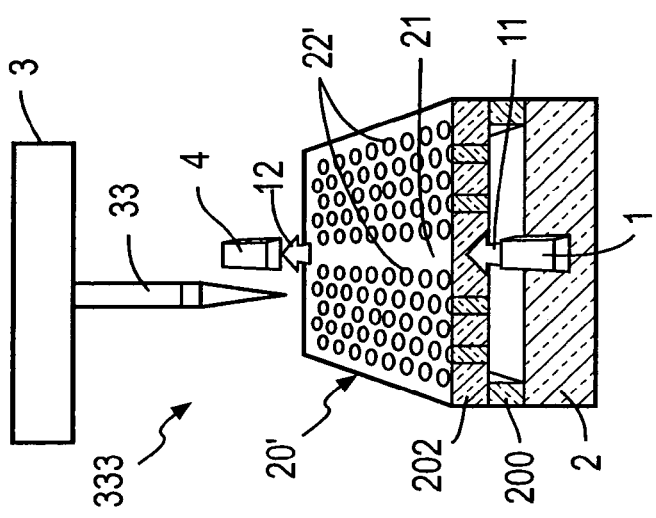
FIG. 5B is a perspective view showing, by way of example, the state in which information is recorded in the optical recording device of FIG. 5A.

FIG. 5B illustrates the case where the diameter of one of the crystalline column 22' is widened to capture the light of the wavelength $\lambda_k$ and three crystalline columns 22' are rendered amorphous to capture the light of the wavelength $\lambda_j$ as in case of FIG. 4B.

This embodiment employs the heating probe 33 as means for changing refractive indexes based on change between the amorphous and crystalline phases in the 2-D photonic crystal 20' utilizing the difference in refractive index between the amorphous and crystalline phases, and Embodiment 2 uses the electric field applying probe 32 for heating the crystalline column 22', but irradiation with light may also be used other than the application of an electric field and heating, or a combination of them is also possible. The heating can be achieved by irradiation with laser light.

FIG. 5C shows the manner in which the recorded pit formed by changing the crystalline column 22' from crystalline to amorphous is erased and restored to the original crystalline column 22'. By heating the recorded pit up to its crystallization temperature by use of the heating probe 33, it is possible to re-form the periodic arrangement of crystalline columns 22'. By this, the recorded information (selected light of the wavelength $\lambda_j$) can be erased.

Figure 6:
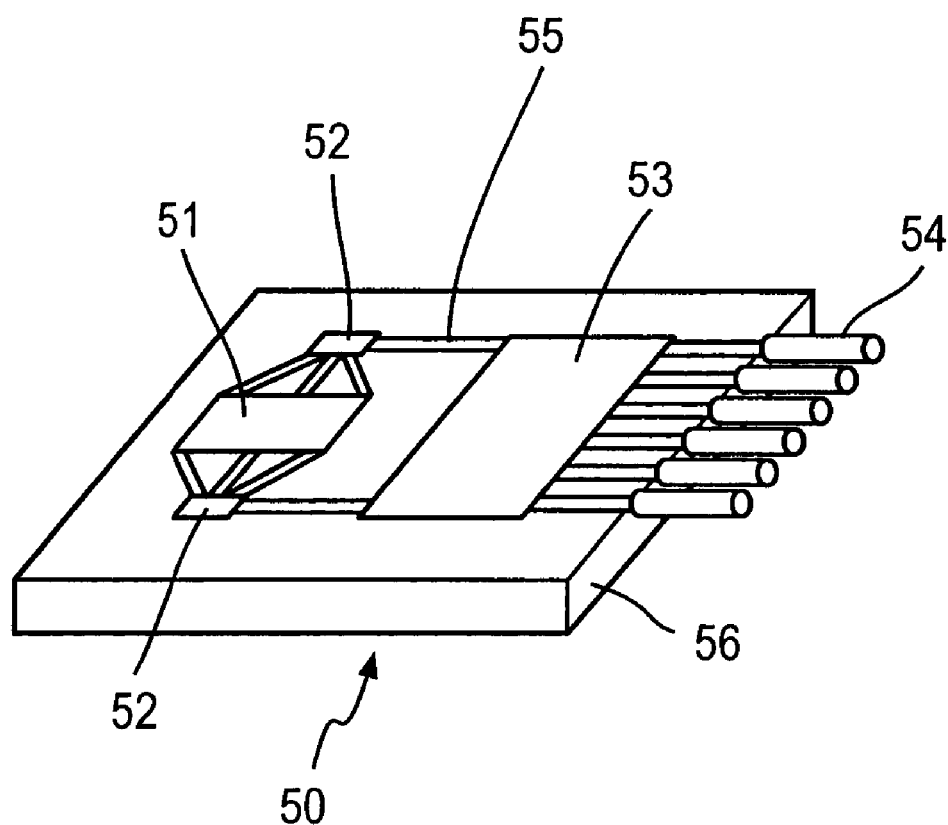
FIG. 6 is a perspective view schematically illustrating an optical circuit having integrated therewith the optical recording device of the present invention.

FIG. 6 illustrates an example in which the optical recording device of the present invention, denoted generally by 51, is integrated with an optical circuit 50. Reference numeral 52 denotes an optical switch, 53 an optical IC, 54 optical fibers, 55 a circuit optical waveguide, and 56 a circuit substrate.

With the illustrated structure, it is possible to achieve very fast optical signal processing since the optical recording device 51 is connected to the optical IC 53 via the circuit optical waveguide 55 and the optical switch 52 in the optical circuit 50.

In the embodiments described above, the $SiO_2$ layer 200 underlying the 2-D photonic crystal 20 (20') is selectively removed by wet etching to form an optimum structure as an air layer, but the $SiO_2$ layer may be left unremoved. In this case, however, the device performance is lower than in the case where the air layer is formed.

The substrate 2 on which to form the 2-D photonic crystal needs only to be a substrate all over the surface of which the 2-D photonic crystal can be formed, and substrates of any configurations can be used. The substrate may be formed, for example, by a semiconductor such as GaAs, metal such as aluminum, alumina, or ceramics such as glass. The substrate needs not be formed of a single material but may also be a composite material such as a multi-layer film.

The light source 1 needs only to be capable of launching light into the optical waveguide 21 of the 2-D photonic crystal, and any light sources can be employed. The light source 1 is not limited specifically to, for example, laser light source but it is possible to use an optical fiber, lens and optical waveguides of various materials. No limitations are imposed on the light source used.

The light detecting unit 4 may be any types of light receiving member. The light detecting unit 4 is not limited specifically to a photodiode or similar light receiving element but may be an optical fiber, lens and or optical waveguides of various materials.

The 2-D photonic crystal is not limited specifically to one that having columnar holes periodically arranged in a triangular lattice pattern, but it may be a 2-D photonic crystal having Si pillars periodically arranged or those of any other similar configurations. As the optical waveguide in the 2-D photonic crystal, too, may be known optical waveguides of various configurations.

What is claimed is:

1. An optical recording device that comprises:
   a light source for emitting light of a plurality of wavelengths;
   an optical waveguide formed by a crystal defect in a slab-structured two-dimensional photonic, crystal comprising a periodic arrangement of columnar holes in a high-refractive-index material into which the light emitted from said optical light source is launched;
   an information recording/erasing unit for changing the diameter of one hole of said columnar holes near said optical waveguide by plastic deformation of said high-refractive-index material through application of pressure by insertion of a probe into said one hole; and
   a light detecting unit for detecting light which is emitted from said optical waveguide.

2. An optical recording device that comprises:
   a light source for emitting light of a plurality of wavelengths;
   an optical waveguide formed by a crystal defect in a slab-structured two-dimensional photonic, crystal comprising a periodic arrangement of crystalline columns in an amorphous thin film into which the light emitted from said optical light source is launched;
   an information recording/erasing unit for changing a state of one column of said crystalline columns near said optical waveguide by heating said one column with a probe; and
   a light detecting unit for detecting light which is emitted from said optical waveguide.

3. The optical recording device of claim 2, wherein said amorphous thin film is formed of a chalcogenide-series material.

* * * * *